US012645259B2

(12) United States Patent
Wang et al.

(10) Patent No.: US 12,645,259 B2
(45) Date of Patent: Jun. 2, 2026

(54) PORTABLE COMPUTER WITH FLEXIBLE DISPLAY

(71) Applicant: Acer Incorporated, New Taipei City (TW)

(72) Inventors: Wei-Chih Wang, New Taipei City (TW); Chi-Yuan Liu, New Taipei City (TW); Chen-Min Hsiu, New Taipei City (TW)

(73) Assignee: Acer Incorporated, New Taipei City (TW)

( * ) Notice: Subject to any disclaimer, the term of this patent is extended or adjusted under 35 U.S.C. 154(b) by 99 days.

(21) Appl. No.: 18/659,003

(22) Filed: May 9, 2024

(65) Prior Publication Data

US 2025/0117045 A1     Apr. 10, 2025

(30) Foreign Application Priority Data

Oct. 4, 2023    (TW) ................................. 112138140

(51) Int. Cl.
*G06F 1/16* (2006.01)
(52) U.S. Cl.
CPC ................................. *G06F 1/1652* (2013.01)
(58) Field of Classification Search
None
See application file for complete search history.

(56) References Cited

U.S. PATENT DOCUMENTS 9,572,272 B2 * 2/2017 Lee ........................... H05K 5/30
9,678,539 B2 * 6/2017 Hayk ................... G06F 1/1626

| | | | | |
|---|---|---|---|---|
| 10,582,629 B2 * | 3/2020 | Xu | ........................... | G09F 9/301 |
| 2012/0314400 A1 * | 12/2012 | Bohn | ................... | H04M 1/0237 |
| | | | | 361/679.01 |
| 2018/0188778 A1 * | 7/2018 | Shin | ....................... | G06F 1/1652 |
| 2022/0053655 A1 * | 2/2022 | Zhang | ................... | G06F 1/1652 |
| 2022/0132687 A1 * | 4/2022 | Liu | ......................... | G06F 1/1624 |
| 2022/0311849 A1 * | 9/2022 | Jia | ......................... | H04M 1/0268 |
| 2023/0095247 A1 * | 3/2023 | Feng | .................... | G06F 1/1624 |
| | | | | 361/679.27 |
| 2023/0097587 A1 * | 3/2023 | Liu | ........................ | G06F 1/1637 |
| | | | | 361/679.27 |

(Continued)

FOREIGN PATENT DOCUMENTS

| | | |
|---|---|---|
| CN | 114170911 | 3/2022 |
| CN | 116798315 | 9/2023 |
| WO | 2021185096 | 9/2021 |

*Primary Examiner* — James Wu
*Assistant Examiner* — Christopher L Augustin
(74) *Attorney, Agent, or Firm* — JCIPRNET

(57) ABSTRACT

A portable computer having flexible display including a housing, a motor, a transmission gear set, a linkage set, and a flexible display is provided. The housing includes a fixing portion and a moving portion movably connected to and partially overlapped on the fixing portion. The motor, the transmission gear set, and the linkage set are disposed in the housing respectively. The linkage set and the transmission gear set are coupled to each other to be a connection and drive mechanism of the fixing portion and the moving portion. A portion of the flexible display is assembled to the fixing portion, and an end portion of the flexible display passes by the moving portion and are wound and stored at a backside of the portion of the flexible display.

9 Claims, 13 Drawing Sheets

(56) References Cited

U.S. PATENT DOCUMENTS

| | | | |
|---|---|---|---|
| 2023/0176613 A1* | 6/2023 | Seo | G06F 1/1652 |
| | | | 361/679.3 |
| 2024/0040717 A1* | 2/2024 | Zhang | G09F 9/301 |
| 2025/0126726 A1* | 4/2025 | Liu | G09F 9/301 |

* cited by examiner

PORTABLE COMPUTER WITH FLEXIBLE DISPLAY

CROSS-REFERENCE TO RELATED APPLICATION

This application claims the priority benefit of Taiwan application serial no. 112138140, filed on Oct. 4, 2023. The entirety of the above-mentioned patent application is hereby incorporated by reference herein and made a part of this specification.

BACKGROUND

Technical Field

The invention relates to a portable computer, and in particular, to a portable computer with a flexible display.

Description of Related Art

With the popularity of mobile electronic devices, display modules in these electronic devices have always been one of the projects that people strive to improve. Recently, flexible display modules have been developed, allowing users to more flexibly change the size of the display surface, while also changing the shape of electronic devices for portability. Especially for notebook computers, due to the technical gains of the flexible display module, it has a wider range of practical applications and higher convenience.

SUMMARY

The present invention provides a portable computer having a flexible display, which provides a display screen that can be horizontally expanded or collapsed according to needs.

The portable computer having flexible display of the present invention includes a housing, a motor, a transmission gear set, a linkage set, and a flexible display. The housing includes a fixing portion and a moving portion movably connected to and partially overlapped on the fixed portion. The motor, the transmission gear set, and the linkage set are disposed in the housing respectively. The linkage set and the transmission gear set are coupled to each other to be a connection and drive mechanism of the fixing portion and the moving portion. A portion of the flexible display is assembled to the fixing portion, and an end portion of the flexible display passes by the moving portion and are wound and stored at a backside of the portion of the flexible display.

Based on above, since the flexible display is partially wrapped and stored on the back side of the portion, it is matched with the motor, the transmission gear set and the linkage set provided in the housing, as well as the fixing portion and the moving portion of the housing, which can effectively allow the flexible display to be unfolded or folded driven by the housing and the aforementioned components. Among them, the opposite sides of the screen of the portable computer are used for the aforementioned storage, that is, the flexible display is partially arranged on the fixing portion. And the end portion of the flexible display passes through and wraps around the moving portion and is stored on the back side of the aforementioned portion. In this way, the user can further expand the moving portion of the screen body laterally after the screen is unfolded relative to the host of the portable computer according to the needs. The flexible display was subsequently expanded and stretched to expand the display area.

DESCRIPTION OF THE EMBODIMENTS

Figure 1:
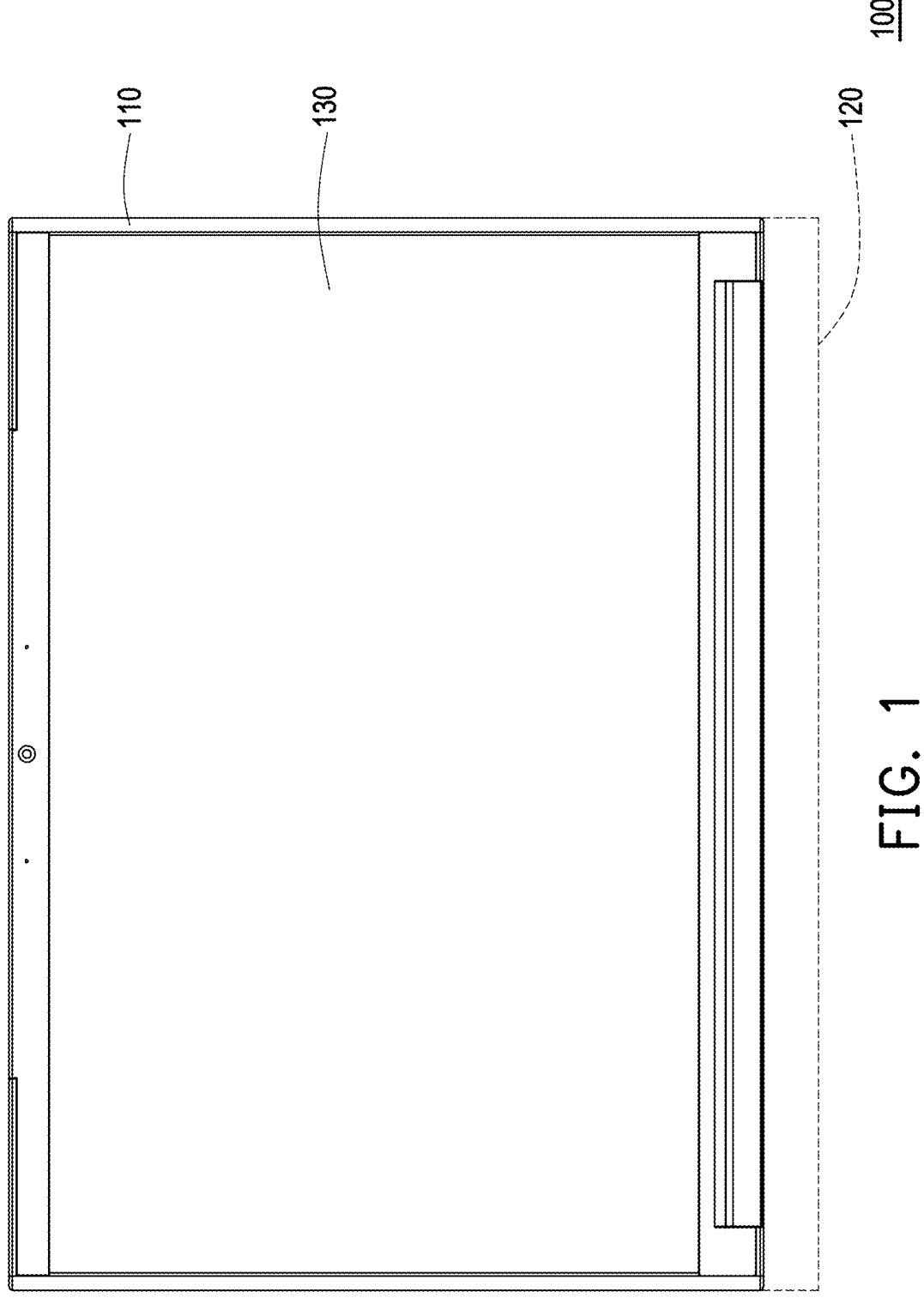
FIG. 1 is a front view of a portable computer according to an embodiment of the present invention.
Figure 2:
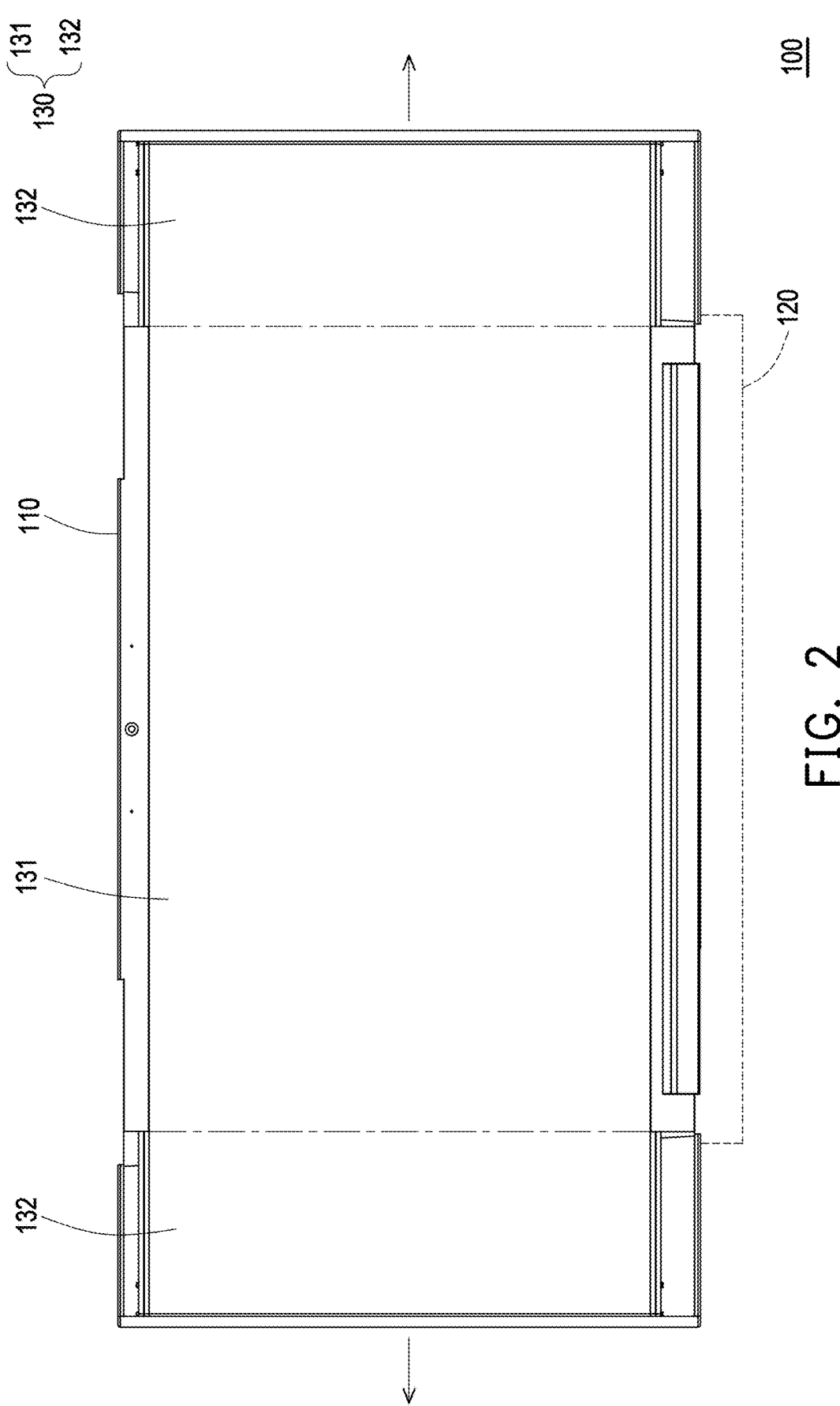
FIG. 2 is a front view of the portable computer of FIG. 1 in another state.
Figure 3A:
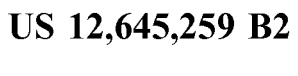
FIG. 3A is an exploded view of some components of the screen of the portable computer in FIG. 1.
Figure 3B:
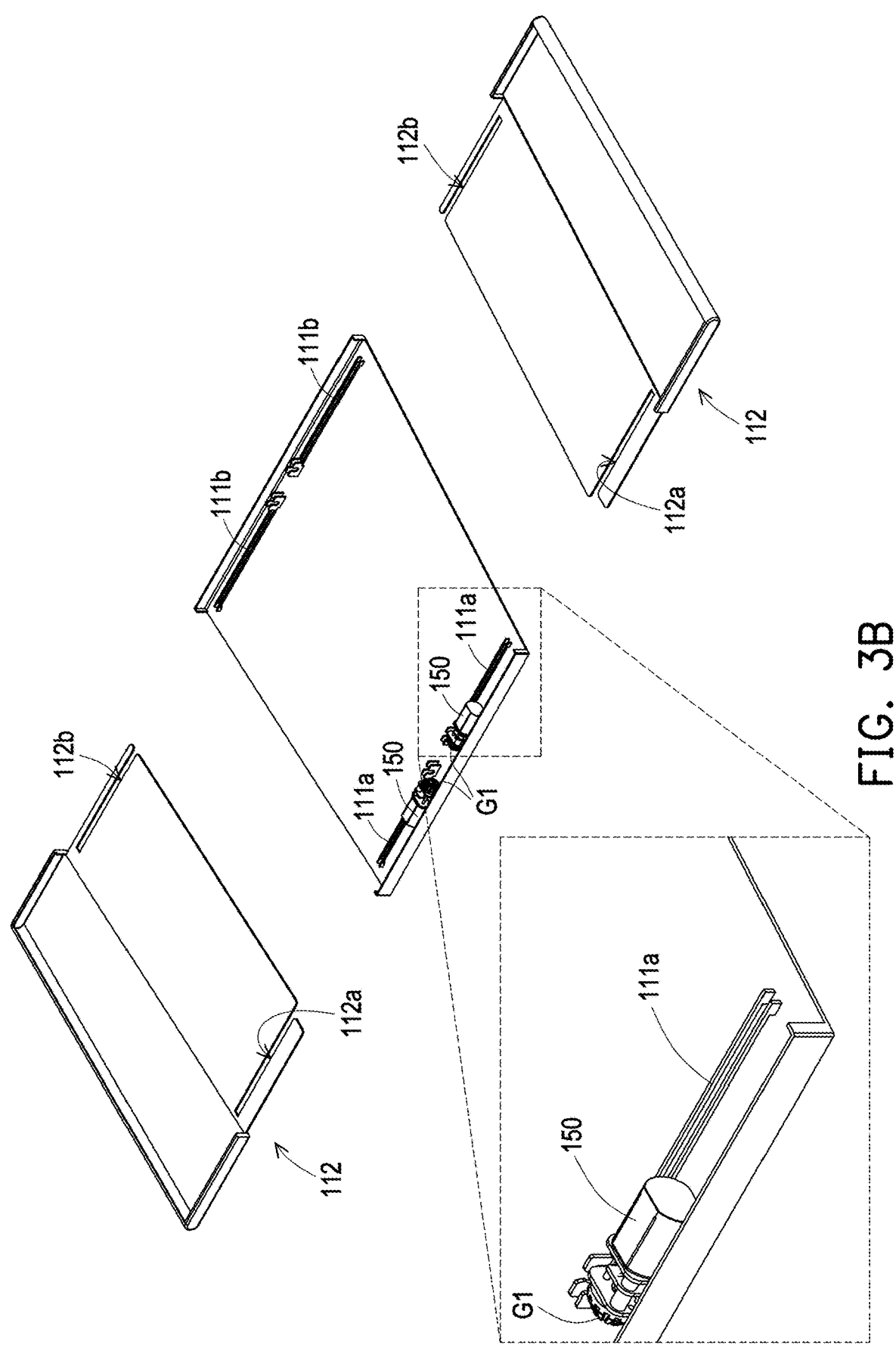
FIG. 3B is an exploded view of some components of FIG. 3A.
Figure 3C:
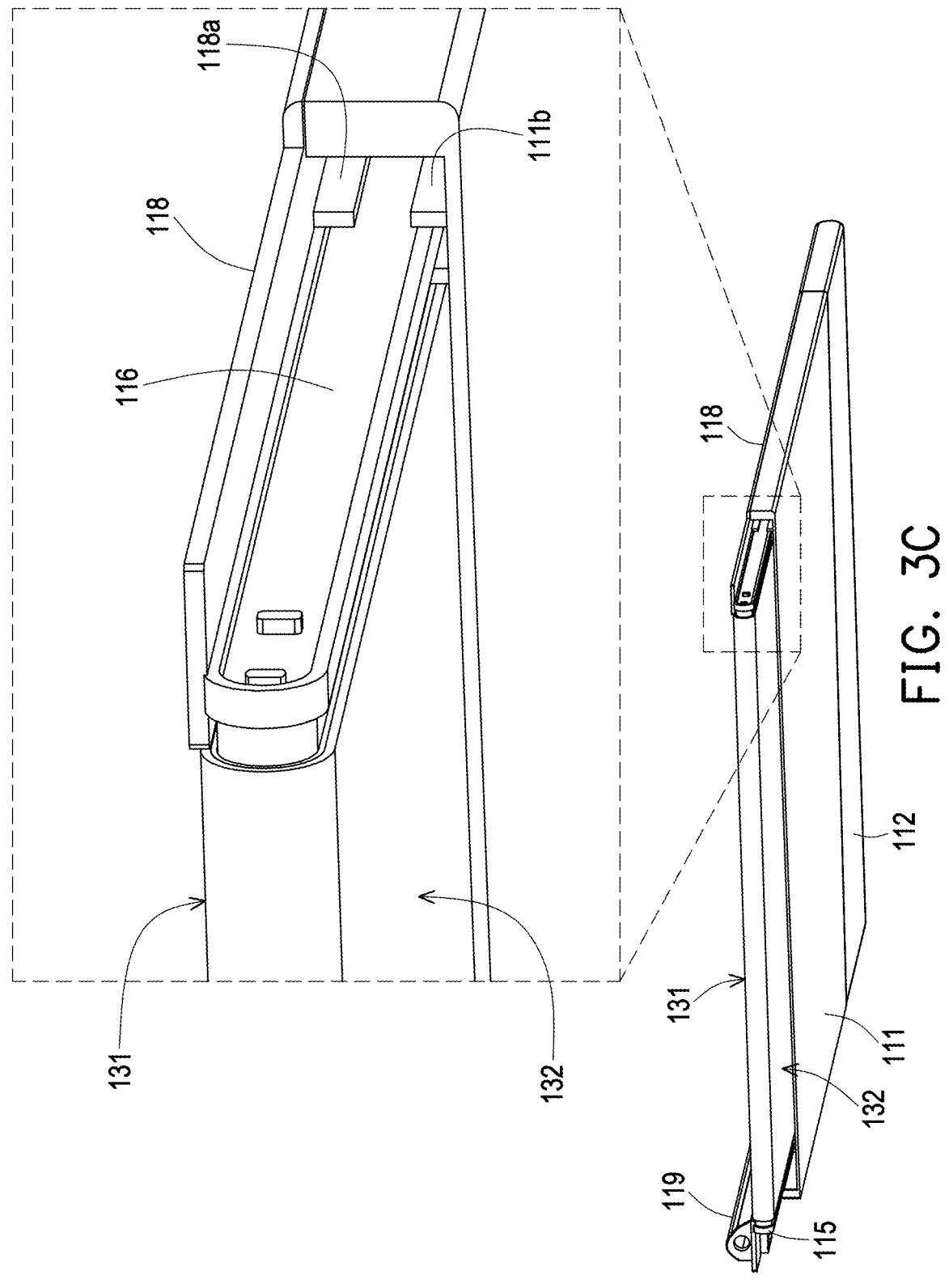
FIG. 3C and FIG. 3D are schematic diagrams of partial components of the portable computer in FIG. 1.
Figure 3D:
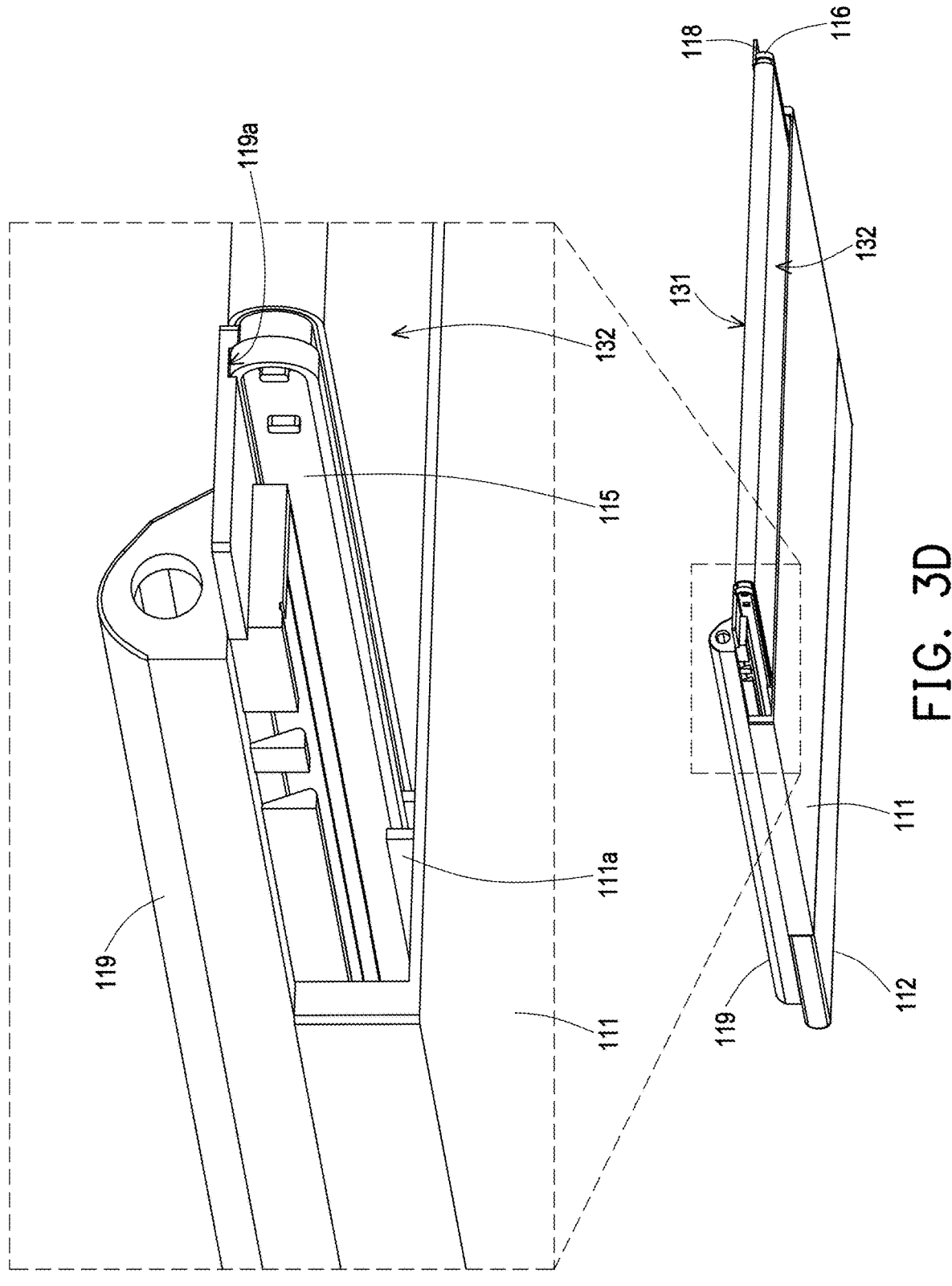
Figure 3E:
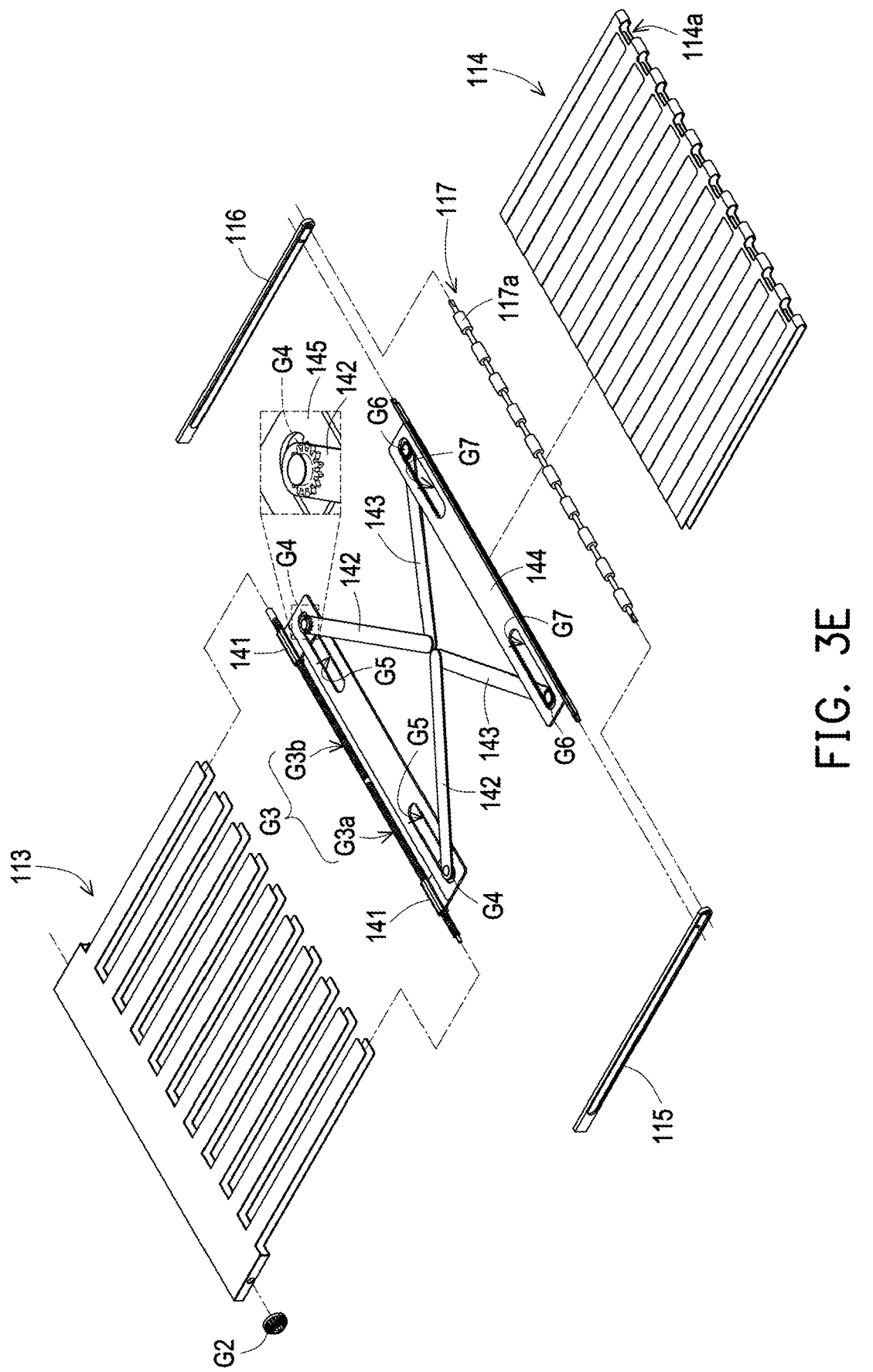
FIGS. 3E and 3F are exploded views of some components of FIG. 3A.
Figure 3F:
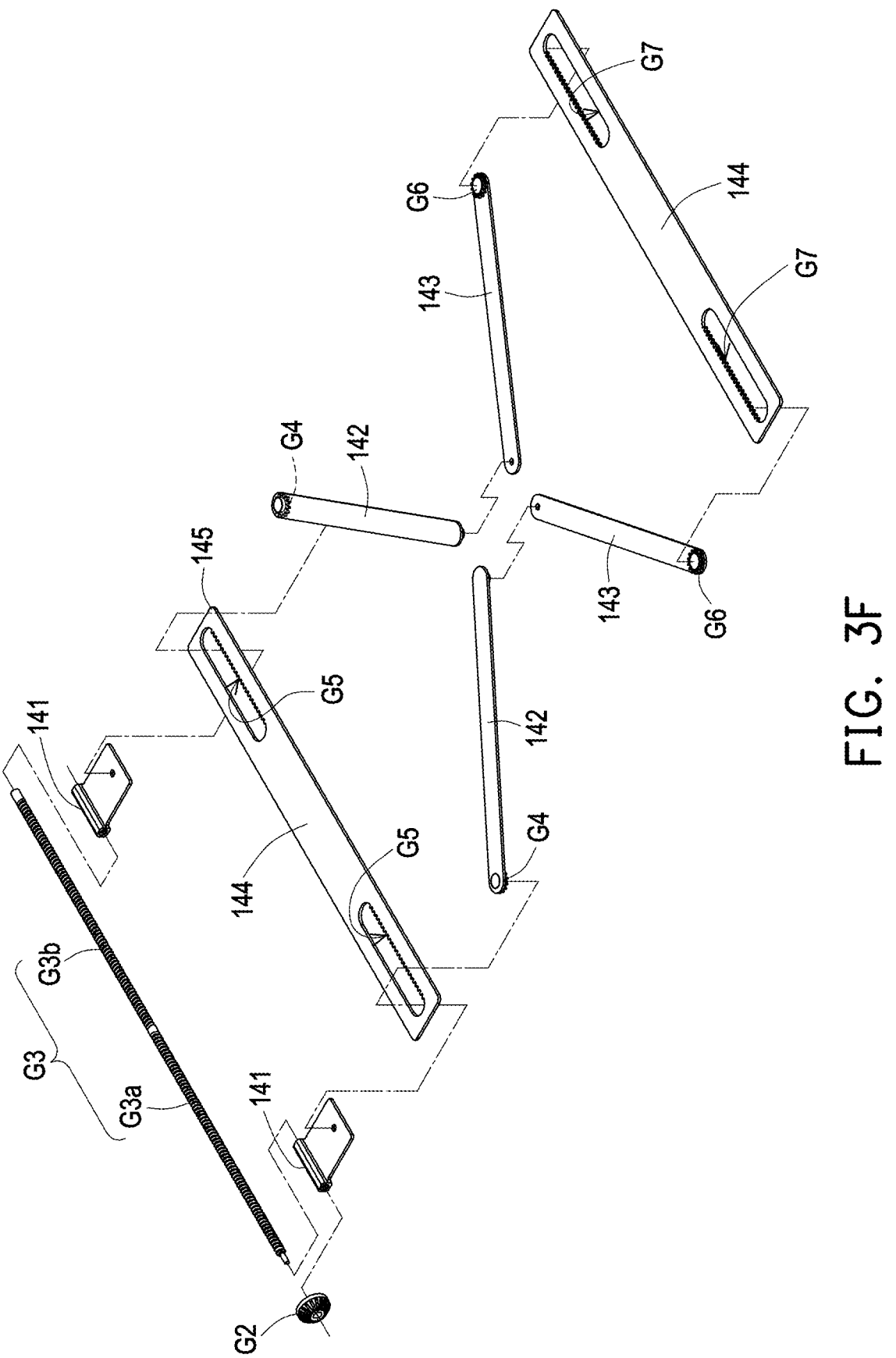

FIG. 1 is a front view of a portable computer according to an embodiment of the present invention. FIG. 2 is a front view of the portable computer of FIG. 1 in another state. FIG. 3A is an exploded view of some components of the screen of the portable computer in FIG. 1. FIG. 3B is an exploded view of some components of FIG. 3A. FIG. 3C and FIG. 3D are schematic diagrams of partial components of the portable computer in FIG. 1, wherein some components are omitted to facilitate identification of the sliding relationship between the housing and its internal components. FIGS. 3E and 3F are exploded views of some components of FIG. 3A. In the embodiment, FIG. 3A, FIG. 3B, FIG. 3D and FIG. 3F respectively provide component explosion diagrams in different positions and different degrees of decomposition based on the relationship and relative position of the components.

Referring to FIG. 1, FIG. 2 and FIG. 3A first, in the embodiment, a portable computer 100 with a flexible display (take a notebook computer as an example, hereafter referred to as the portable computer 100), which includes housings 110, 120 and a flexible display 130. The housing 110 is, for example, the display portion of a notebook computer, and the flexible display 130 is installed in it. The housing 120 is, for example, a host of a notebook computer, and it is pivotally connected to the housing 110 through a hinge (not shown here), so that the housings 110 and 120 can pivot to open and close with each other. In the portable computer 100 of FIG. 1 and FIG. 2, the housing 110 has been unfolded relative to the housing 120, and the housing 110 is viewed from the user's perspective and the housing 120 is operated at the same time. It should be noted that the technical features of the hinge are already known in the prior art, and therefore will not be described again in the embodiment.

As shown in FIG. 3A, the housing 110 of the embodiment includes a housing component, a support component and covers 118, 119. The housing component is composed of a fixing portion 111 and a moving portion 112, and the fixing portion 111 and the moving portion 112 are in a state of movably connected to each other, which will be further explained later. The support component is composed of a component one AS1 and a component two AS2 that are symmetrical to each other, and each has the same components. The flexible display 130 is carried on and driven by the support component to match the relative movement of the moving portion 112 and the fixing portion 111, so as to achieve the different driving modes and the two states of unfolded and folded of the flexible display 130 as shown in FIG. 1 and FIG. 2.

It should be mentioned first that, comparing FIG. 3A with FIG. 1 and FIG. 2, it can be clearly seen that the flexible display 130 has different display surfaces 131 and 132, wherein display surfaces 132 are respectively formed on opposite sides of the display surface 131. And in the states shown in FIG. 1 and FIG. 3A, the display surface 132 is bent and hidden behind the display surface 131 (the aforementioned folded state), and in the state shown in FIG. 2, the flexible display 130 is driven to be flattened, and the display surface 132 hidden behind is converted to a position coplanar with the display surface 131 and exposed at the same time (the aforementioned unfolded state).

Next, referring to FIG. 3A and FIG. 3B, as a housing component that accommodates the aforementioned support component, the flexible display 130 and the covers 118, 119, it actually includes a fixing portion 111 and a pair of moving portions 112 located on opposite sides of the fixing portion 111. And the fixing portion 111 and any of the moving portions 112 are in a state of sliding contact with each other. Furthermore, the moving portion 112 has slots 112a, 112b, and the fixing portion 111 has tracks 111a, 111b. Wherein the groove outer wall of the track 111a is slidably connected to the slot 112a, and the groove outer wall of the track 111b is slidably connected to the slot 112b, so that the moving portion 112 can slide relative to the fixing portion 111 to achieve unfolded or folded effect.

Then please refer to FIG. 3C and FIG. 3D, and simultaneously compare FIG. 3B or FIG. 3A, in the embodiment, FIG. 3C and FIG. 3D respectively omit one of the moving portions 112 to facilitate identification of the sliding relationship between components. As shown in FIG. 3A, the support component used to carry the flexible display 130 has the component one AS1 and the component two AS2 each having track members 115 and 116. In FIG. 3C, the lower part of the track member 116 is slidably connected to the track 111b of the fixing portion 111. At the same time, the bottom surface of the cover 118 has a track 118a, which is slidably connected to the upper part of the track member 116 (the track member 116 is coupled to the inner wall of the track 111b). The track 118a has the same structural characteristics as the track 111b. In other words, as shown in FIG. 3A, when the cover 118 is assembled to the housing component, the track 118a and the track 111b will form restrictions on the height direction of the track member 116 symmetrically up and down, so that the track member 116 can stably and uniquely slide back and forth along a single axis (i.e., along the tracks 111b, 118a).

Correspondingly, FIG. 3D shows another cover 119 having a groove 119a, which together with the track 111a of the fixing portion 111 forms a restriction on the track member 115, so that the track member 115 can achieve the same effect of single-axial reciprocating motion as the aforementioned track member 116. Accordingly, from the aforementioned component relationships, it can be deduced to the structure shown in FIG. 3A. It can be clearly understood that the support component can produce the above-mentioned single axial reciprocating sliding through the track members 115, 116, and cooperate with other components of the support component to perform relative sliding opening and closing (i.e., the aforementioned unfolded or folded) of the moving portion 112 relative to the fixing portion 111, as shown in FIG. 1 and FIG. 2.

Then, referring to FIG. 3E and FIG. 3F, which further decompose the support component. The component one AS1 shown on the right side of FIG. 3A is used as an example for disassembly, and the component two AS2 shown on the left side has the same component composition and will not be described again. Here, the component one AS1 includes a first grid structure 113, a second grid structure 114 and the aforementioned track members 115 and 116. Wherein the second grid structure 114 is assembled on the track members 115, 116, and is cross-coupled with the first grid structure 113, so that they can guide each other and slide. In this way, the second grid structure 114 can move closer or farther away from the first grid structure 113.

Referring to FIG. 3E, FIG. 3F and to FIG. 3A, further speaking, the portable computer 100 further includes a motor 150 and a transmission component. The motor 150 is disposed in the fixing portion 111 of the housing 110 as shown in FIG. 3A, and the transmission component is accommodated in the space defined by the aforementioned first grid structure 113, the second grid structure 114 and the track members 115, 116. In the embodiment, the transmission component is divided into a gear set and a linkage set. The linkage set includes two linkage pairs, each linkage pair includes a first rod 142 and a second rod 143 that are pivotally connected to each other. And the gear set includes a cone gear G1 (bevel gear), a cone gear G2 (bevel gear), a screw rod G3, a driving member 141, a carrier board 144 with an internal rack G5 (bar-shaped tooth), a gear G4 (spur gear), a gear G6 (spur gear) and another carrier board 144 with an internal rack G7 (bar-shaped tooth). Among them, the cone gear G1 is set on the motor 150, and the cone gear G2 is set on the screw rod G3 and coupled to the cone gear G1, so that the output of the motor 150 can be smoothly transmitted to the screw rod G3.

Furthermore, a pair of driving members 141 is sleeved on the screw rod G3, and the sleeve of the driving members 141 has internal screw threads (not shown) to couple to the screw rod G3. The screw rod G3 has a pair of screw threads G3a, G3b, and the directions of the screw threads G3a, G3b are opposite to each other, so that the pair of driving members 141 is sleeved on the screw rod G3 and coupled to different screw threads G3a, G3b respectively. Then, when the aforementioned motor 150 drives the screw rod G3 to rotate through the cone gears G1 and G2, the rotation of the screw rod G3 drives the pair of driving members 141 to move closer or away from each other.

In addition, the gear G4 is fixed to one end of the first rod 142 and this end and the gear G4 are pivotally connected to the driving member 141 (the other end of the first rod 142 is pivotally connected to the second rod 143). At the same time, the gear G4 is coupled to the internal rack G5 of the carrier board 144. Therefore, when the driving member 141 moves closer or farther away along the screw rod G3, the driving member 141 can drive the gear G4 to rotate and move along the internal rack G5, thereby driving the first rod 142 to rotate relative to the carrier board 144. In this way, the rotating first rod 142 can rotate the second rod 143. Like the gear G4 and the first rod 142 mentioned above, the gear G6 is also fixed on the second rod 143, and the gear G6 is also coupled to the internal rack G7 of the carrier board 144. Therefore, when the second rod 143 is pushed and rotated by the first rod 142, it also means that the gear G6 rotates and moves along the internal rack G7, so that the carrier board 144 on the right side of the figure can be pushed away.

Similarly, when the motor 150 drives the cone gear G1 to rotate in the opposite direction compared to the above, the above mechanism can also pull back the carrier board 144 on the right side.

In the embodiment, the carrier board 144 adjacent to the screw rod G3 is essentially clamped between a pair of first rods 142 and a pair of driving members 141 in a floating state. In another embodiment not shown, the carrier board 144 has assembly posts connected to the track members 115, 116. The aforementioned carrier board 144 adjacent to the screw rod G3 may also form the structure of the assembly posts and be fixed to the fixing portion 111 or the second grid structure 114 of the housing 110.

Figure 4A:
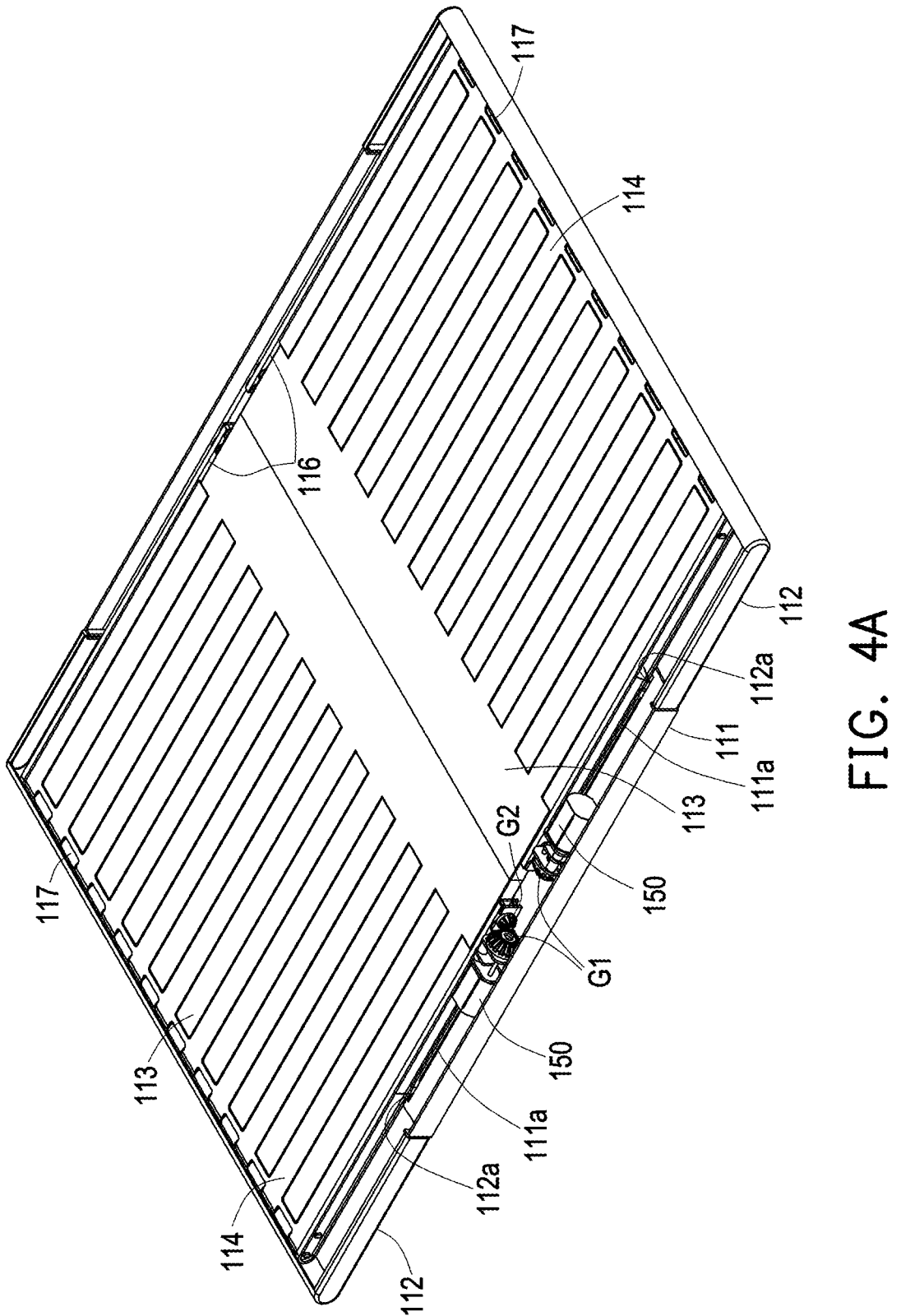
FIGS. 4A and 4B are respectively the folded state of some components of the screen.
Figure 4B:
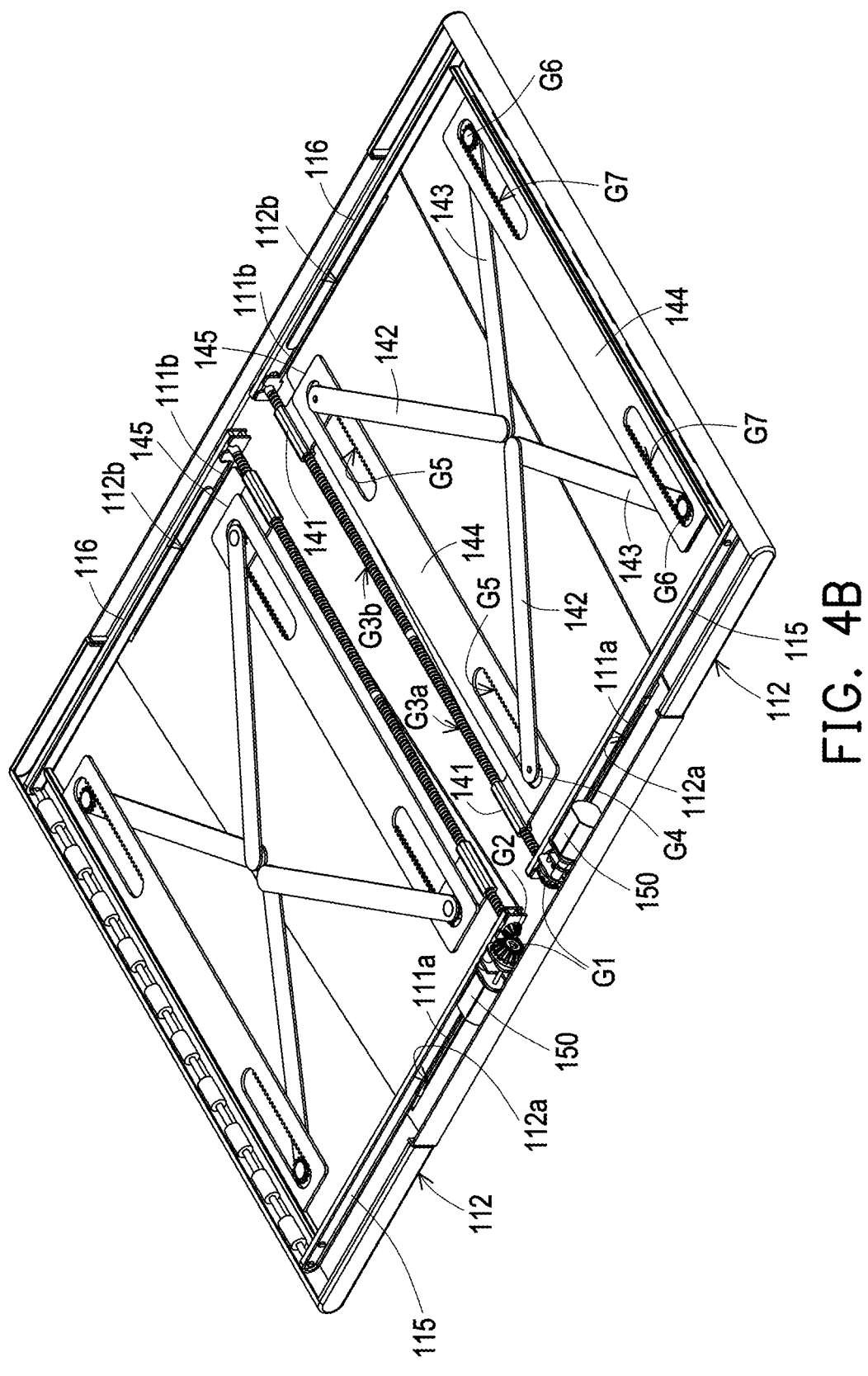
Figure 5A:
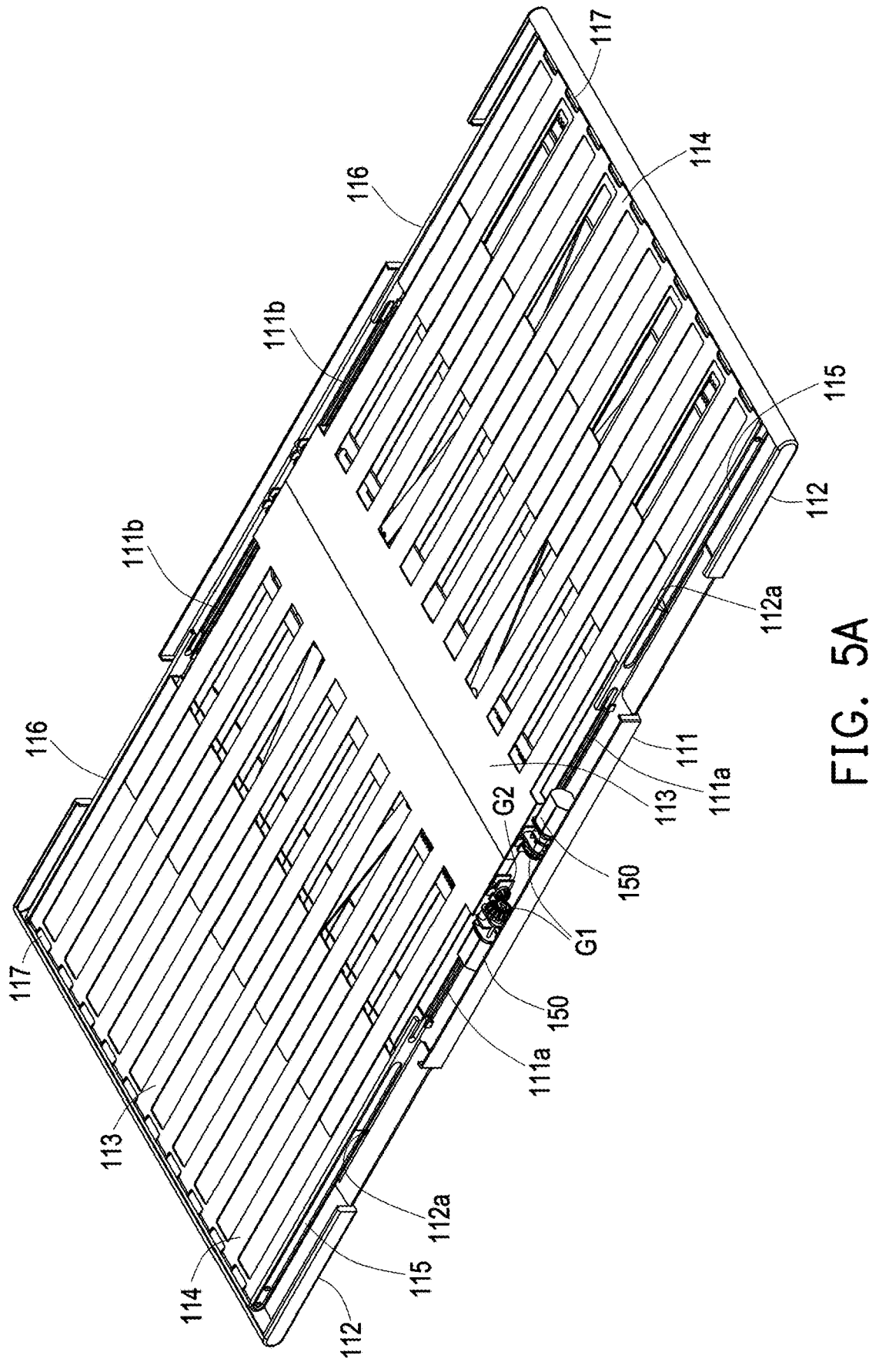
FIGS. 5A and 5B are respectively the unfolded state of some components of the screen.
Figure 5B:
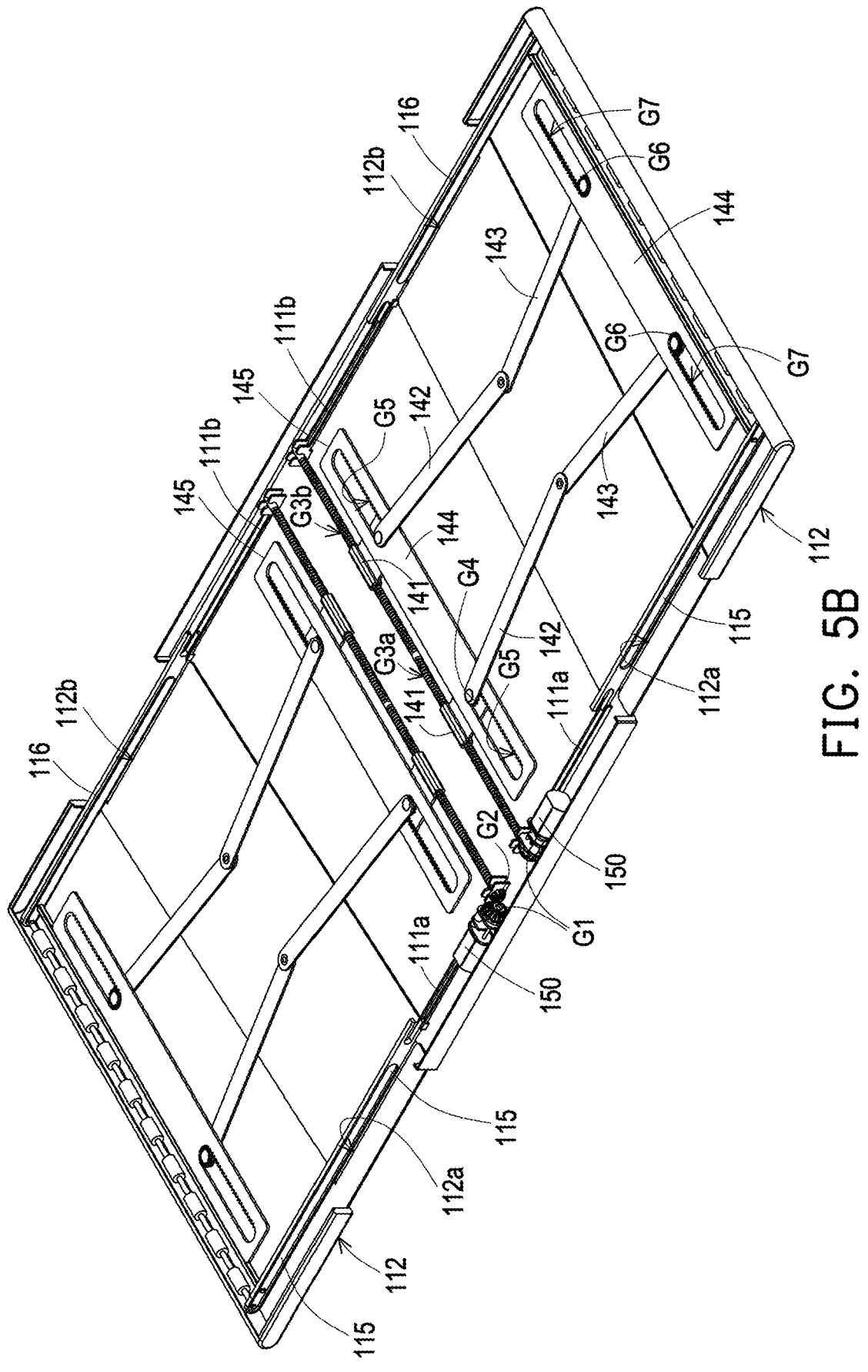

FIGS. 4A and 4B are respectively the folded state of some components of the screen. FIGS. 5A and 5B are respectively the unfolded state of some components of the screen. Referring to FIG. 4A and FIG. 5A first, it should be noted that the housing 110 of the present invention is based on the fixing portion 111, and the moving portions 112 are respectively provided on the left and right opposite sides of the housing 110. In this way, the two moving portions 112 are respectively movably connected and partially overlapped on the fixing portion 111, and the two moving portions 112 can be driven to be pulled out or pushed in from the fixing portion 111 like a drawer, as detailed below.

The transmission set is shown in FIG. 3E and FIG. 3F (along with the above features), under the mutual matching of the gear set and the linkage set, when the motor 150 is started, the screw rod G3 is driven to rotate through the cone gears G1 and G2 in sequence, so that the driving member 141 can move (closer or farther away) on the screw rod G3 due to the rotation of the screw rod G3. Then, the driving member 141 moves through the gear G4 to rotate and move along the internal rack G5, thereby driving the first rod 142 to also rotate and move synchronously with the gear G4. In this way, the second rod 143 can be further pushed to rotate and move, thereby driving (rotating and moving) the second rod 143. In addition, the gear G6 is also driven to rotate and move along the internal rack G78 to drive the carrier board 144, and smoothly push the moving portion 112 away from the fixing portion 111, as shown in the conversion from FIG. 4B to FIG. 5B.

As mentioned above, the present invention takes a pair of moving portions 112 as an example, so the relevant driving components (such as the aforementioned motor 150, the component one AS1, component two AS2 and the transmission set) are configured symmetrically. However, it is expected that through appropriate adjustments and technical means, some components can also be simplified into a single component, such as the motor 150 or the screw rod G3 That is to say, a single motor and a single screw rod can drive symmetrical transmission sets.

As shown in FIG. 4A and FIG. 5A (and compare with FIG. 3A), a portion of the flexible display 130, such as the display surface 131, is fixed on the first grid structure 113. The ends of the flexible display 130, as shown on the opposite sides of the display surface 132, pass through and wrap around the second grid structure 114 and move to the back side of the portion (the display surface 131). Here, the first grid structure 113 and the second grid structure 114 are folded or unfolded relative to each other along with the moving portion 112 and the fixing portion 111. When the first grid structure 113 and the second grid structure 114 are folded, the flexible display 130 is supported by a flat surface formed by their complementary shapes.

In addition, referring to FIG. 3E, the portable computer 100 further includes a driving roller set 117, which are respectively provided on the side edges of the moving portion 112 away from the fixing portion 111 and assembled to the track members 115, 116. And the roller 117*a* of the driving roller set 117 will protrude from the opening 114*a* of the second grid structure 114. The end portion (the display surface 132) of the flexible display 130 is rolled by the driving roller set 117 and extends to the back side of the portion (the display surface 132). That is, the bend of the flexible display 130 can be supported by the roller 117*a*.

Figure 6:
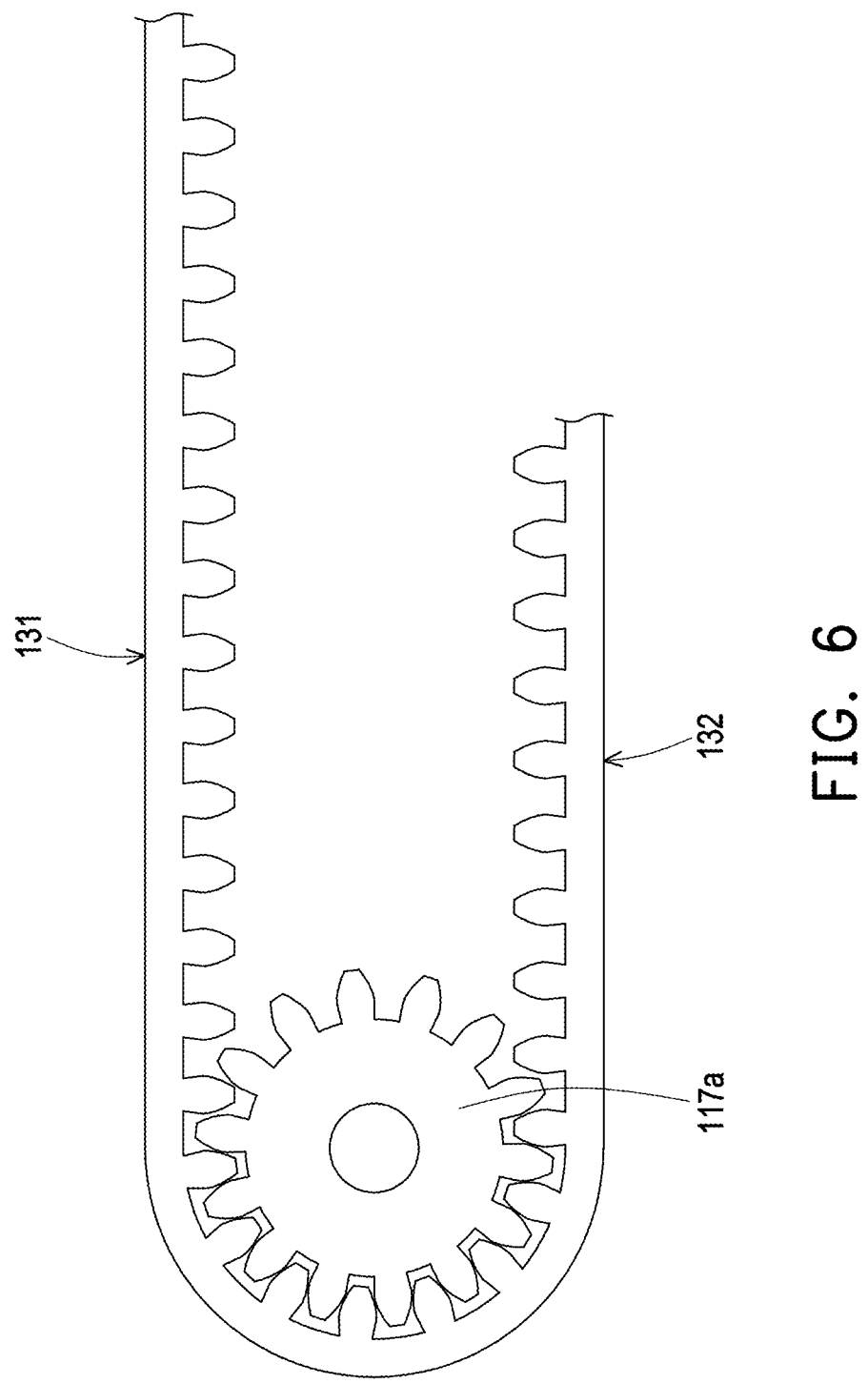
FIG. 6 is a side view of partial components of a screen according to another embodiment.

FIG. 6 is a side view of partial components of a screen according to another embodiment. Referring to FIG. 6 and to FIG. 3, the driving roller set of this embodiment uses a gear 117*a* instead of the aforementioned roller. Correspondingly, the back of the flexible display 130 (away from the display surfaces 131, 132) has a plurality of tooth structures and is movably coupled to the gear. And the driving roller set 117*a* is essentially pivotally connected to the moving portion 112. Accordingly, when the moving portion 112 is gradually pushed away from the fixing portion 111 by the linkage set, also represents that the end portion (the display surface 132) of the flexible display 130 will be affected by the matching relationship between the above-mentioned tooth structure and the gear, it is gradually rolled up to a state in the same plane as the portion (the display surface 131) located on the fixing portion 111. That is to say, it is equivalent to flattening the original left and right end portions of the flexible display 130 around the back side, so that the display surfaces 131 and 132 are coplanar, as shown in FIG. 2. In this way, the effect of increasing the display area is achieved.

In summary, in the above-described embodiment of the present invention, since the flexible display is partially wrapped and stored on the back side of the portion, it is matched with the motor, the transmission gear set and the linkage set provided in the housing, as well as the fixing portion and the moving portion of the housing, which can effectively allow the flexible display to be unfolded or folded driven by the housing and the aforementioned components. Among them, the opposite sides of the screen of the portable computer are used for the aforementioned storage, that is, the flexible display is partially arranged on the fixing portion. And the end portion of the flexible display passes through and wraps around the moving portion and is stored on the back side of the aforementioned portion. In this way, the user can further expand the moving portion of the screen body laterally after the screen is unfolded relative to the host of the portable computer according to the needs. The flexible display was subsequently expanded and stretched to expand the display area.

What is claimed is:
1. A portable computer, comprising:
a housing, comprises a fixing portion and at least one moving portion, the moving portion is movably connected to and partially overlapped on the fixing portion;
a motor, disposed in the housing;
a transmission gear set, disposed in the housing;
a linkage set, disposed in the housing, the linkage set is coupled to the transmission gear set to be a connection and drive mechanism between the fixing portion and the moving portion
a flexible display, a portion of the flexible display is assembled to the fixing portion, and an end portion of the flexible display passes by the moving portion and are wound and stored at a backside of the portion of the flexible display, wherein the transmission gear set comprises:
a screw rod, disposed in the fixing portion;

a pair of cone gears, respectively connecting the motor and the screw rod, so that the motor drives the screw rod to rotate through the pair of cone gears;

a carrier board, having a groove and a bar-shaped tooth, the bar-shaped tooth is located on the side wall of the groove;

a driving member, sleeved on the screw rod and having internal threads coupled to the screw rod; and a gear, pivoted to the driving member, rotatably disposed in the groove and coupled to the bar-shaped tooth, when the screw rod rotates, the screw rod drives the driving member to move along the screw rod, and the driving member drives the gear to pivot and move in the groove.

2. The portable computer according to claim 1, wherein the linkage set comprises:

a first rod, one end of the first rod is fixed to the gear, so that the rotation of the gear synchronously drives the first rod to rotate with the first end;

a second rod, one end of the second rod is pivotally connected to the first rod, the other end of the second rod is pivotally connected to the moving portion, wherein the driving member moves on the fixing portion to drive the gear to rotate with the first rod, and drives the moving portion to move relative to the fixing portion through the second rod.

3. The portable computer according to claim 1, wherein the fixing portion has a first grid structure, the moving portion has a second grid structure, the first grid structure and the second grid structure are movably coupled to each other to guide each other, the portion of the flexible display is fixed to the first grid structure, the end portion of the flexible display moves through and around the second grid structure to the back side of the portion.

4. The portable computer according to claim 3, wherein the first grid structure and the second grid structure collapse or expand with the moving portion and the fixing portion, when the first grid structure and the second grid structure are folded, the shapes complement each other to form a flat surface to support the flexible display.

5. The portable computer according to claim 1, further comprises a driving roller set, disposed on the moving portion, the end portion of the flexible display is wound around the driving roller set and extends to the back side of the portion.

6. The portable computer according to claim 5, wherein the driving roller set comprises at least one gear, a back portion of the flexible display has a plurality of tooth structures movably coupled to the gear.

7. The portable computer according to claim 1, wherein the housing comprises a pair of moving portions, respectively movably disposed on opposite sides of the fixing portion.

8. The portable computer according to claim 7, wherein the opposite end portions of the flexible display pass by the pair of moving portions respectively and are wound and stored at the backside of the portion.

9. The portable computer according to claim 7, wherein the opposite end of the linkage set is coupled to the pair of moving portions respectively, so that when the motor drives the linkage set through the transmission gear set, the linkage set synchronously drives the pair of moving portions to move relative to the fixing portion to collapse or expand.

* * * * *